United States Patent
Watanabe

(10) Patent No.: US 9,334,942 B2
(45) Date of Patent: May 10, 2016

(54) DRIVE TORQUE DISTRIBUTION APPARATUS

(71) Applicant: KABUSHIKI KAISHA TOYOTA CHUO KENKYUSHO, Nagakute-shi, Aichi-ken (JP)

(72) Inventor: Takao Watanabe, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 14/248,823

(22) Filed: Apr. 9, 2014

(65) Prior Publication Data

US 2014/0315675 A1     Oct. 23, 2014

(30) Foreign Application Priority Data

Apr. 17, 2013 (JP) ................................ 2013-086252

(51) Int. Cl.
*F16H 48/36* (2012.01)
*F16H 48/34* (2012.01)

(52) U.S. Cl.
CPC .............. *F16H 48/36* (2013.01); *F16H 48/34* (2013.01); *F16H 2048/343* (2013.01); *F16H 2048/364* (2013.01)

(58) Field of Classification Search
CPC ... F16H 48/36; F16H 2048/364; F16H 48/34; F16H 2048/343
USPC .......................................... 475/150, 151, 231
See application file for complete search history.

(56) References Cited

U.S. PATENT DOCUMENTS

| | | | | |
|---|---|---|---|---|
| 8,591,370 | B2 * | 11/2013 | Yang | 475/156 |
| 2003/0211914 | A1 * | 11/2003 | Perkins et al. | 475/231 |
| 2007/0249456 | A1 * | 10/2007 | Meixner | 475/150 |
| 2008/0058149 | A1 * | 3/2008 | Yang | 475/230 |

(Continued)

FOREIGN PATENT DOCUMENTS

| | | |
|---|---|---|
| JP | 2009-174597 A | 8/2009 |
| JP | 2012-178971 A | 9/2012 |
| WO | WO2005110790 A2 * | 11/2005 |
| WO | WO 2011/076542 A1 | 6/2011 |
| WO | WO 2012/028372 A1 | 3/2012 |

OTHER PUBLICATIONS

Apr. 28, 2015 Office Action issued in Japanese Application No. 2013-086252.

(Continued)

*Primary Examiner* — Roger Pang
(74) *Attorney, Agent, or Firm* — Oliff PLC

(57) ABSTRACT

When a first drive shaft and a second drive shaft rotate at equal rotational speeds, a first rotor and a second rotor rotate at equal rotational speeds. On the other hand, a rotational difference is generated between the first drive shaft and the second shaft by generating a torque between the first rotor and the second rotor and consequently, a rotational difference between the first rotor and the second rotor, so that a torque distribution between the first drive shaft and the second drive shaft is adjusted according to the torque generated between the first rotor and the second rotor. With this process, the torque distribution between the first drive shaft and the second drive shaft is adjusted without complicating the structure, and a loss when the first drive shaft and the second drive shaft rotate at equal rotational speeds is reduced.

3 Claims, 7 Drawing Sheets

(56) References Cited

U.S. PATENT DOCUMENTS

2012/0220409 A1* 8/2012 Yang .............................. 475/149
2012/0220410 A1* 8/2012 Yang .............................. 475/151
2012/0220412 A1* 8/2012 Yang .............................. 475/156
2012/0220413 A1* 8/2012 Yang .............................. 475/156

OTHER PUBLICATIONS

Dec. 1, 2015 Office Action issued in Japanese Patent Application No. 2013-086252.

* cited by examiner

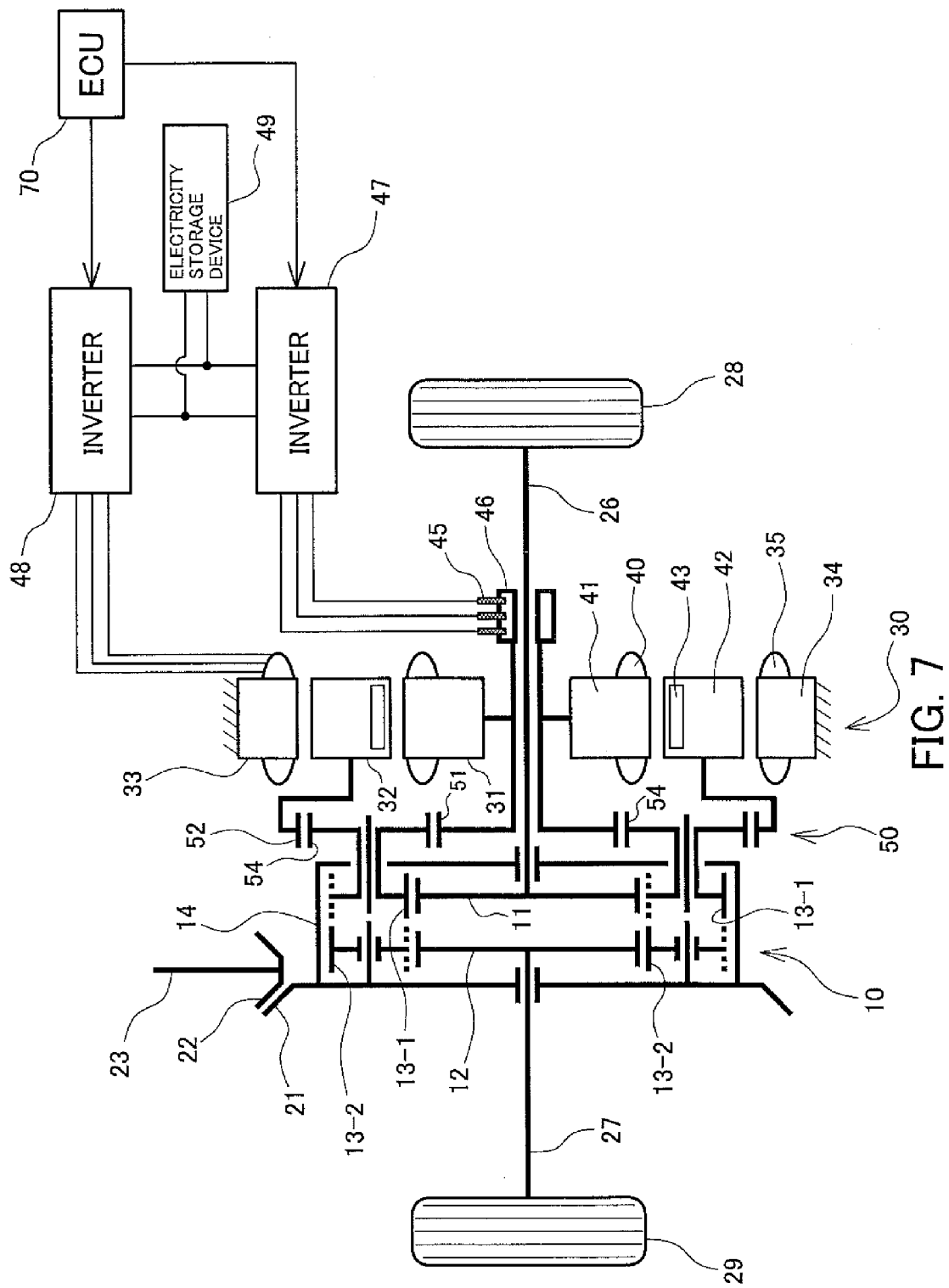

DRIVE TORQUE DISTRIBUTION APPARATUS

PRIORITY INFORMATION

This application claims priority to Japanese Patent Application No. 2013-086252, filed on Apr. 17, 2013, which is incorporated herein by reference in its entirety.

BACKGROUND

1. Technical Field

The present invention relates to a drive torque distribution apparatus which adjusts a torque distribution between a first drive shaft and a second drive shaft.

2. Related Art

International Publication No. 2011/76542 discloses a technique related to a drive torque distribution apparatus of this type. The drive torque distribution apparatus of International Publication No. 2011/76542 comprises a differential device, first, second, and third planetary gear mechanisms, and a motor. The motor has a stator and a rotor, and the rotor is linked to a sun gear of the first planetary gear mechanism. Carriers of the first and second planetary gear mechanisms are linked, and rotation of the sun gear of the second planetary gear mechanism is fixed. A ring gear of the first planetary gear mechanism is linked to a ring gear of the third planetary gear mechanism, a ring gear of the second planetary gear mechanism is linked to a sun gear of the third planetary gear mechanism, and a pinion gear (planetary gear) of the third planetary gear mechanism is linked to a pinion gear of the differential device.

In International Publication No. 2011/76542, when a right side gear and a left side gear of the differential device (a right drive shaft and a left drive shaft) rotate in the same direction at equal rotational speeds, the rotational speed of the ring gear of the first planetary gear mechanism and the rotational speed of the ring gear of the second planetary gear mechanism are equal to each other, and the rotation of the rotor is stopped. On the other hand, when a torque is applied from the stator to the rotor to rotationally drive the rotor, a rotational difference is caused between the ring gear and the sun gear of the third planetary gear mechanism (the ring gear of the first planetary gear mechanism and the ring gear of the second planetary gear mechanism), and the pinion gear of the third planetary gear mechanism integrally rotates (spins) with the pinion gear of the differential device. Due to the spinning of the pinion gear of the differential device, a rotational difference is caused between the right side gear and the left side gear (the right drive shaft and the left drive shaft), and a torque distribution between the right drive shaft and the left drive shaft is changed according to the torque applied from the stator to the rotor.

In International Publication No. 2011/76542, a torque is applied from the stator to the rotor to rotationally drive the rotor, so that the pinion gear of the differential device rotates (spins), and the torque distribution between the right drive shaft and the left drive shaft is changed. However, in order to realize the spinning of the pinion gear of the differential device by the rotational driving of the rotor, it is necessary to use three planetary gear mechanisms, resulting in complexity of the structure for adjusting the torque distribution. In addition, when the right side gear and the left side gear (the right drive shaft and the left drive shaft) of the differential device rotate in the same direction with equal rotational speeds, the rotation of the rotor is stopped. However, in this case, the sun gear, pinion gear, and ring gear of the first and second planetary gear mechanisms are not integrally rotated, and a loss is caused due to occurrence of a rotational difference (differential) between the sun gear and the ring gear due to the spinning of the pinion gear. An advantage of the present invention is that a torque distribution between first and second drive shafts is adjusted while not complicating the structure, and the loss when the first drive shaft and the second drive shaft rotate at equal rotational speeds is reduced.

SUMMARY

According to one aspect of the present invention, there is provided a drive torque distribution apparatus comprising: a differential device that permits a rotational difference between a first drive shaft and a second shaft; and a torque distribution adjusting device that adjusts a torque distribution between the first drive shaft and the second drive shaft, wherein the torque distribution adjusting device includes a rotary electric machine that can generate a torque between a first rotor and a second rotor rotatable relative to each other, the torque distribution adjusting device transmits rotation of the first and second rotors or rotation corresponding to a rotational difference between the first rotor and the second rotor to the differential device, the first rotor and the second rotor rotate at equal rotational speeds when the first drive shaft and the second drive shaft rotate at equal rotational speeds, a torque is generated between the first rotor and the second rotor to generate a rotational difference between the first rotor and the second rotor and to consequently generate a rotational difference between the first drive shaft and the second shaft, and the torque distribution between the first drive shaft and the second drive shaft is adjusted according to the torque generated between the first rotor and the second rotor.

According to another aspect of the present invention, preferably, the torque distribution adjusting device further comprises a rotation transmitting device that transmits the rotation corresponding to the rotational difference between the first rotor and the second rotor to the first drive shaft or the second drive shaft.

According to another aspect of the present invention, preferably, the rotation transmitting device amplifies and outputs the torque generated between the first rotor and the second rotor.

According to another aspect of the present invention, preferably, the differential device comprises: a first differential rotation element that rotates with the first drive shaft; a second differential rotation element that rotates with the second drive shaft; a third differential rotation element that transmits rotation between the first and second differential rotation elements, and a fourth differential rotation element that rotatably supports the third differential rotation element and that causes, with rotation thereof, the third differential rotation element to circle around a rotational axis of the first differential rotation element, wherein the rotational difference between the first drive shaft and the second drive shaft is permitted by rotation of the third differential rotation element, and the rotation transmitting device comprises: a first transmitting rotation element that rotates with the first rotor; a second transmitting rotation element that rotates with the second rotor; a third transmitting rotation element that rotates with the first drive shaft or the second drive shaft; and a fourth transmitting rotation element that circles around a rotational axis of the third transmitting rotation element in response to the rotation of the fourth differential rotation element, that rotates according to the generation of the rotational difference between the first transmitting rotation element and the second transmitting rotation element, and that transmits the rotation to the third transmitting rotation element.

According to another aspect of the present invention, preferably, the differential device comprises: a first differential rotation element that rotates with the first drive shaft; a second differential rotation element that rotates with the second drive shaft; a third differential rotation element that transmits rotation between the first and second differential rotation elements; and a fourth differential rotation element that rotatably supports the third differential rotation element and that causes, with rotation thereof, the third differential rotation element to circle around a rotational axis of the first differential rotation element, wherein the rotational difference between the first drive shaft and the second drive shaft is permitted by rotation of the third differential rotation element, and, in the torque distribution adjusting device, the first rotor rotates with the first differential rotation element or the second differential rotation element, and the second rotor rotates with the fourth differential rotation element.

According to another aspect of the present invention, preferably, the differential device comprises: a first differential rotation element that rotates with the first drive shaft; a second differential rotation element that rotates with the second drive shaft; a third differential rotation element that transmits rotation between the first and second differential rotation elements; and a fourth differential rotation element that rotatably supports the third differential rotation element and that causes, with rotation thereof, the third differential rotation element to circle around a rotational axis of the first differential rotation element, wherein the rotational difference between the first drive shaft and the second drive shaft is permitted by rotation of the third differential rotation element, and the torque distribution adjusting device further comprises a rotation transmitting device that transmits rotation corresponding to a rotational difference between the first rotor and the second rotor to the third differential rotation element.

According to another aspect of the present invention, preferably, the rotation transmitting device comprises: a first transmitting rotation element that rotates with the first rotor; a second transmitting rotation element that rotates with the second rotor; and a third transmitting rotation element that circles around a rotational axis of the first differential rotation element with the third differential rotation element in response to the rotation of the fourth differential rotation element, and that rotates with the third differential rotation element according to the generation of the rotational difference between the first transmitting rotation element and the second transmitting rotation element.

According to another aspect of the present invention, preferably, the rotary electric machine comprises a stator that can generate a torque between the stator and the second rotor.

According to various aspects of the present invention, the torque distribution between the first drive shaft and the second drive shaft can be adjusted according to the torque generated between the first rotor and the second rotor while not complicating the structure, and the loss when the first drive shaft and the second drive shaft rotate at equal rotation speeds can be reduced.

BRIEF DESCRIPTION OF THE DRAWINGS

Preferred embodiments of the present invention will be described in detail by reference to the following drawings, wherein:

FIG. 7 is a diagram schematically showing a structure of a drive torque distribution device according to a sixth preferred embodiment of the present invention.

DESCRIPTION OF EXEMPLARY EMBODIMENTS

Preferred embodiments of the present invention will now be described with reference to the drawings.

Figure 1:
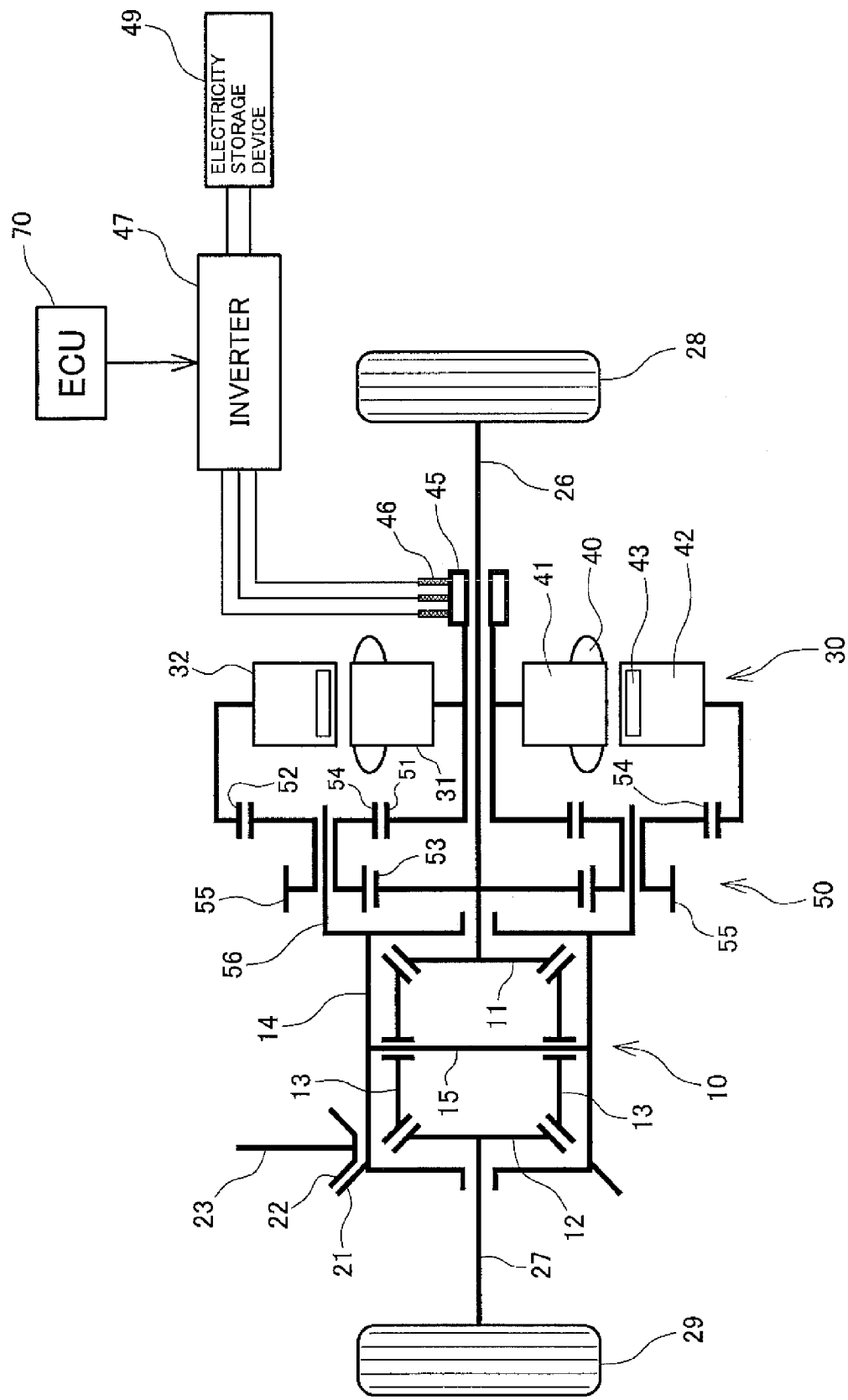
FIG. 1 is a diagram schematically showing a structure of a drive torque distribution apparatus according to a first preferred embodiment of the present invention.

FIG. 1 is a diagram schematically showing a structure of a drive torque distribution apparatus according to a first preferred embodiment of the present invention. The drive torque distribution apparatus according to the present embodiment comprises a differential device 10, a rotary electric machine 30, and a rotation transmitting device 50, to be described below.

The differential device 10 is formed from a differential gear device including a pair of side gears 11 and 12 acting as a first differential rotation element and a second differential rotation element, a plurality of pinion gears 13 acting as a third differential rotation element, and a rotation case (differential case) 14 acting as a fourth differential rotation element. Each pinion gear 13 is formed from a bevel gear, and is rotatably supported on a pinion shaft 15 provided on the rotation case 14. The side gears 11 and 12 are also formed from bevel gears, and the pinion gears 13 engage the side gears 11 and 12. A rotation center axis of the rotation case 14 is coincident with rotation center axes of the side gears 11 and 12, and a rotation center axis of each pinion gear 13 (center axis of the pinion shaft 15) is perpendicular with respect to the rotation center axis of the side gears 11 and 12 and the rotation case 14. The pinion gears 13 rotate (spin) about the pinion shaft 15, to transmit rotation between the side gears 11 and 12 through the pinion gears 13. In this process, the direction of the torque is inverted at the pinion gears 13 so that the torque directions would be opposite to each other between the side gears 11 and 12, and the torque is then transmitted between the side gears 11 and 12. The pinion gears 13 circle (revolve) around the rotation center axis of the side gears 11 and 12 (which is coincident with the rotation center axis of the rotation case 14) by the rotation of the rotation case 14. With the circling (revolution) of the pinion gears 13, the rotation is transmitted between the side gears 11 and 12 and the rotation case 14. In this process, the torque is transmitted between the side gears 11 and 12 and the rotation case 14 such that the directions of the torque are the same between the side gears 11 and 12 and the rotation case 14.

The side gear 11 mechanically engages a drive shaft (first drive shaft) 26, the drive shaft 26 is mechanically linked to a drive wheel 28 of a vehicle, and the side gear 11 integrally rotates with the drive shaft 26 and the drive wheel 28 at the same rotational speed. The side gear 12 mechanically engages a drive shaft (second drive shaft) 27, the drive shaft 27 is mechanically linked to a drive wheel 29 of the vehicle, and the side gear 12 integrally rotates with the drive shaft 27 and the drive wheel 29 at the same rotational speed. In the following description, the side gear 11, drive shaft 26, and the drive wheel 28 are referred to as a right side gear, a right drive shaft, and a right drive wheel, respectively, and, similarly, the side gear 12, drive shaft 28, and drive wheel 29 are referred to as a left side gear, a left drive shaft, and a left drive wheel, respectively.

A driven gear 21 is fixed on an outer circumference of the rotation case 14, and the driven gear 21 engages a drive gear 22. The drive gear 22 is mechanically linked to a propeller shaft 23, and integrally rotates with the propeller shaft 23 at the same rotational speed. The propeller shaft 23 is rotationally driven, for example, by transmission of motive power from a motive power source such as an engine or a motor. The rotation of the propeller shaft 23 is transmitted to the rotation case 14 through the engagement between the drive gear 22 and the driven gear 21.

The rotary electric machine 30 comprises a first rotor 31, and a second rotor 32 which opposes the first rotor 31 with a predetermined gap therebetween, and which can rotate relative to the first rotor 31. The first rotor 31 comprises a rotor core (first rotor iron core) 41 and a rotor winding 40 of a plurality of phases (for example, three phases) provided along a circumferential direction of the rotor core 41. By an AC current of a plurality of phases (for example, three phases) flowing in the rotor winding 40 of the plurality of phases, the rotor winding 40 can generate a rotational magnetic field which rotates in the circumferential direction of the rotor. The second rotor 32 comprises a rotor core (second rotor iron core) 42, and a permanent magnet 43 which is provided on the rotor core 42 opposing the first rotor 31 along the circumferential direction of the rotor core 42, and which generates a field magnetic flux. A slip ring 45 is mechanically linked to the first rotor 31 and is electrically connected to each phase of the rotor winding 40. A brush 46 having its rotation fixed is pushed onto the slip ring 45 and is brought into electrical contact with the slip ring 45. The slip ring 45 rotates with the first rotor 31 at the same rotational speed while sliding with respect to the brush 46 (while maintaining electrical contact with the brush 46). In the example configuration shown in FIG. 1, the first rotor 31, the second rotor 32, the slip ring 45, and the brush 46 are placed at an outer circumferential side of the right drive shaft 26. The first rotor 31 and the second rotor 32 oppose in a radial direction orthogonal to the rotor rotational axis, the second rotor 32 is concentrically placed at an outer circumferential side of the first rotor 31, and a rotation center axis of the first rotor 31 and a rotation center axis of the second rotor 32 are coincident with a rotation center axis of the right drive shaft 26 (the rotation center axis of the right side gear 11).

The rotation transmitting device 50 is formed from a planetary gear mechanism including a sun gear 51 acting as a first transmitting rotation element, a ring gear 52 acting as a second transmitting rotation element, a sun gear 53 acting as a third transmitting rotation element, a plurality of pinion gears (planetary gears) 54 and 55 acting as a fourth transmitting rotation element, and a carrier 56 acting as a fifth transmitting rotation element. The sun gears 51 and 53 and the pinion gears 54 and 55 are formed with outer gears, the pinion gears 54 engage the sun gear 51 and a ring gear (inner gear) 52, and the pinion gears 54 and 55 engage the sun gear 53. The pinion gears 54 and 55 are rotatably supported on the carrier 56. A rotation center axis of the sun gear 51, a rotation center axis of the ring gear 52, a rotation center axis of the sun gear 53, and a rotation center axis of the carrier 56 are coincident with each other, and rotation center axes of the pinion gears 54 and 55 are parallel to these rotation center axes. The pinion gears 54 and 55 are coupled with each other, and integrally rotate (spin) at the same rotational speed. In addition, the pinion gears 54 and 55 circle (revolve) around the rotation center axes of the sun gears 51 and 53 in response to the rotation of the carrier 56.

The sun gear 51 is mechanically linked to the first rotor 31, and integrally rotates with the first rotor 31 at the same rotational speed. The ring gear 52 is mechanically linked to the second rotor 32, and integrally rotates with the second rotor 32 at the same rotational speed. The sun gear 53 mechanically engages the right drive shaft 26, and integrally rotates with the right side gear 11 and the right drive shaft at the same rotational speed. The carrier 56 is mechanically linked to the rotation case 14, and integrally rotates with the rotation case 14 at the same rotational speed. In the example configuration of FIG. 1, a radius $r_{s2}$ of the sun gear 53 is greater than a radius $r_{s1}$ of the sun gear 51, and a radius $r_{p2}$ of the pinion gear 55 is smaller than a radius $r_{p1}$ of the pinion gear 54. A radius $r_{r1}$ ($r_{r1}=r_{s1}+2\times r_{p1}$) of the ring gear 52 is greater than a sum ($r_{s2}+2\times r_{p2}$) of the radius $r_{s2}$ of the sun gear 53 and a diameter of the pinion gear 55, $2\times r_{p2}$. In addition, in the example configuration shown in FIG. 1, the rotation transmitting device 50 is placed on an outer circumferential side of the right drive shaft 26, and is placed, in the direction of the rotation center axis of the right drive shaft 26, at a position between the differential device 10 and the rotary electric machine 30. The rotation center axes of the sun gears 51 and 53, the ring gear 52, and the carrier 56 are coincident with the rotation center axis of the right drive shaft 26 (the rotation center axis of the right side gear 11).

An electricity storage device 49 which is provided as a DC power supply and which can be charged and discharged can be formed from, for example, a secondary battery, and stores electric energy. An inverter 47 provided between the electricity storage device 49 and the rotor winding 40 as an electric power conversion device for converting electric power can be realized by a known structure having a switching element and a diode (rectifying element) which is connected in a reverse parallel manner with respect to the switching element, and can convert, with a switching operation of the switching element, DC electric power from the electricity storage device 49 into AC electric power (for example, three-phase AC electric power), and supply the converted AC electric power to the phases of the rotor winding 40 through the brush 46 and the slip ring 45. Moreover, the inverter 47 can also execute electric power conversion to convert the AC current flowing in phases of the rotor winding 40 into DC, and recover the electric energy to the electricity storage device 49. In this process, the AC electric power of the rotor winding 40 is extracted by the slip ring 45 and the brush 46, and the extracted AC electric power is converted into DC by the inverter 47. As described, the inverter 47 can execute the electric power conversion in both directions between the electricity storage device 49 and the rotor winding 40.

With the switching operation of the inverter 47, an AC current of a plurality of phases (for example, three phases) flows in the rotor winding 40 of a plurality of phases, and a rotational magnetic field which rotates in the circumferential direction of the rotor is generated in the rotor winding 40. By electromagnetic interaction (attraction and repulsion) between the rotational magnetic field generated in the rotor winding 40 and the field magnetic flux generated by the permanent magnet 43, a torque (magnet torque) can be applied between the first rotor 31 and the second rotor 32. An electronic control unit (ECU) 70 controls the switching operation of the inverter 47 to control the AC current flowing in the phases of the rotor winding 40. For example, the ECU 70 controls an amplitude and a phase angle of the AC current flowing in the rotor winding 40, to control the torque applied between the first rotor 31 and the second rotor 32.

Next, an operation of the drive torque distribution apparatus of the present embodiment; in particular, an operation when the right drive shaft 26 and the left drive shaft 27 are rotationally driven, will be described.

When motive power from the motive power source such as the engine or the motor is transmitted through the propeller shaft 23 to the rotation case 14 of the differential device 10, the rotation case 14 is rotationally driven, and, in response to the rotation of the rotation case 14, the pinion gears 13 circle (revolve) around the rotation center axes of the side gears 11 and 12, and the right drive shaft 26 and the is left drive shaft 27 are rotationally driven. When the right drive shaft 26 and the left drive shaft 27 (right drive wheel 28 and left drive wheel 29) rotate in the same direction at equal rotational speeds, the pinion gears 13 do not rotate (spin) around the pinion shaft 15, and the side gears 11 and 12, the pinion gear 13, and the rotation case 14 of the differential device 10 are integrally and rotationally driven. In addition, in response to the rotation of the rotation case 14, the carrier 56 of the rotation transmitting device 50 is rotationally driven, and the pinion gears 54 and 55 circle (revolve) around the rotation center axes of the sun gears 51 and 53, so that the sun gears 51 and 53, the ring gear 52, the pinion gears 54 and 55, and the carrier 56 of the rotation transmitting device 50 are integrally and rotationally driven. Therefore, the first rotor 31 and the second rotor 32 of the rotary electric machine 30 rotate in the same direction with an equal rotational speed. When the drive torque is to be distributed equivalently to the right drive shaft 26 and the left drive shaft 27, no switching operation of the inverter 47 is executed, so that no AC current flows in the rotor winding 40 and, consequently, no torque $\tau_{coup}$ is generated between the first rotor 31 and the second rotor 32.

On the other hand, when the torque $\tau_{coup}$ is generated between the first rotor 31 and the second rotor 32 by applying the AC current in the rotor winding 40 by the switching operation of the inverter 47, the first rotor 31 and the second rotor 32 rotate in relation to each other, a rotation difference is generated, and a rotation difference is generated between the sun gear 51 and the ring gear 52 of the rotation transmitting device 50. A torque applied from the first rotor 31 through the sun gear 51 to the pinion gears 54 and 55 and a torque applied from the second rotor 32 through the ring gear 52 to the pinion gears 54 and 55 are in the same direction, and, thus, the pinion gears 54 and 55 rotate (spin) at a rotational speed corresponding to the rotational speed difference between the sun gear 51 and the ring gear 52 (the rotational speed difference between the first rotor 31 and the second rotor 32) and the rotations of the pinion gears 54 and 55 are transmitted to the sun gear 53. When the right side gear 11 of the differential device 10 is rotationally driven by the torque transmitted from the pinion gears 54 and 55 to the sun gear 53, the pinion gears 13 rotate (spin) around the pinion shaft 15, so that the left side gear 12 is rotationally driven. A torque applied from the sun gear 53 to the right drive shaft 26 and a torque applied from the sun gear 53 through the right side gear 11, the pinion gear 13, and the left side gear 12 to the left drive shaft 27 are in opposite directions, and, thus, the drive torque distribution between the right drive shaft 26 and the left drive shaft 27 is changed and a rotational difference corresponding to the spin speeds of the pinion gears 54 and 55 (the rotational speed difference between the first rotor 31 and the second rotor 32) is generated between the right drive shaft 26 and the left drive shaft 27. In this process, the rotation transmitting device 50 transmits rotation corresponding to the rotational difference between the first rotor 31 and the second rotor 32 to the right side gear 11 (right drive shaft 26) of the differential device 10, so that the pinion gears 13 rotate (spin) around the pinion shaft 15, and the rotational difference between the right side gear 11 and the left side gear 12 (the right drive shaft 26 and the left drive shaft 27) is permitted.

For example, when the torque $\tau_{coup}$ of the same direction as the rotational direction of the first rotor 31 and the second rotor 32 (for $\tau_{coup}$, the rotational direction of the first and second rotors 31 and 32 when the drive shafts 26 and 27 rotate in the same direction with an equal rotational speed is defined as a positive direction) is applied from the second rotor 32 to the first rotor 31, and, as a reaction thereof, a torque $-\tau_{coup}$ in the opposite direction from the rotational direction of the first rotor 31 and the second rotor 32 is applied from the first rotor 31 to the second rotor 32, the drive torque distribution of the right drive shaft 26 is increased and the drive torque distribution of the left drive shaft 27 is reduced. When the rotational speed of the first rotor 31 becomes higher than the rotational speed of the second rotor 32, the rotational speed of the right drive shaft 26 becomes higher than the rotational speed of the left drive shaft 27.

On the other hand, when the torque $-\tau_{coup}$ in the direction opposite the rotational direction of the first rotor 31 and the second rotor 32 is applied from the second rotor 32 to the first rotor 31, and, as a reaction thereof, the torque $\tau_{coup}$ in the same direction as the rotational direction of the first rotor 31 and the second rotor 32 is applied from the first rotor 31 to the second rotor 32, the drive torque distribution of the right drive shaft 26 is reduced and the drive torque distribution of the left drive shaft 27 is increased. When the rotational speed of the first rotor 31 becomes lower than the rotational speed of the second rotor 32, the rotational speed of the right drive shaft 26 becomes lower than the rotational speed of the left drive shaft 27.

The torque $\tau_{coup}$ between the first rotor 31 and the second rotor 32 for generating the drive torque difference of $2 \times \tau$ between the right drive shaft 26 and the left drive shaft 27 is represented by the following Equation (1). As shown by the Equation (1), as the torque $\tau_{coup}$ acting between the first rotor 31 and the second rotor 32 becomes larger, the drive torque difference between the right drive shaft 26 and the left drive shaft 27 becomes larger. Therefore, the drive torque distribution between the right drive shaft 26 and the left drive shaft 27 is adjusted according to the torque $\tau_{coup}$ generated between the first rotor 31 and the second rotor 32, and the rotary electric machine 30 and the rotation transmitting device 50 function as a torque distribution adjusting device that adjusts the drive torque distribution between the right drive shaft 26 and the left drive shaft 27 (the right drive wheel 28 and the left drive wheel 29). In this process, the rotation transmitting device 50 can be designed to satisfy the following Equation (2), so that the torque $\tau_{coup}$ between the first rotor 31 and the second rotor 32 is amplified and output from the sun gear 53, and the rotation transmitting device 50 functions as a torque amplification mechanism (gear-reduction mechanism). The electronic control unit 70 can control the drive torque distributions between the right drive shaft 26 and the left drive shaft 27 by controlling the AC current flowing in the phases of the rotor winding 40 through the switching operation of the inverter 47 to consequently control the torque $\tau_{coup}$ between the first rotor 31 and the second rotor 32.

[Equation 1]

$$\tau_{COUP} = \frac{2 r_{p2} r_{r1} r_{s1}}{r_{s2}(r_{p1} r_{s1} + r_{p1} r_{r1})} \tau \quad (1)$$

$$\left(\frac{r_{p1}}{r_{r1}} + \frac{r_{p1}}{r_{s1}}\right) \times \frac{r_{s2}}{r_{p2}} > 1 \quad (2)$$

When a rotational difference is generated between the right drive shaft 26 and the left drive shaft 27, as the rotational speed difference between the first rotor 31 and the second rotor 32 becomes larger, the rotational speed difference between the right drive shaft 26 and the left drive shaft 27 becomes larger. When the torque $\tau_{coup}$ between the first rotor 31 and the second rotor 32 is to be applied in a direction to increase the rotational speed difference between the right drive shaft 26 and the left drive shaft 27 (the rotational speed difference between the first rotor 31 and the second rotor 32), a switching operation of the inverter 47 is applied so that the DC electric power from the electricity storage device 49 is converted into AC and supplied through the brush 46 and the slip ring 45 to the rotor winding 40. For example, when the torque $\tau_{coup}$ in the same direction as the rotational direction is to be applied to the first rotor 31 and the torque $-\tau_{coup}$ in the direction opposite the rotational direction is to be applied to the second rotor 32 in a state where the rotational speed of the first rotor 31 is higher than the rotational speed of the second rotor 32, or when the torque $\tau_{coup}$ in the same direction as the rotational direction is to be applied to the second rotor 32 and the torque $-\tau_{coup}$ in the direction opposite the rotational direction is to be applied to the first rotor 31 in a state where the rotational speed of the second rotor 32 is higher than the rotational speed of the first rotor 31, electric power is supplied from the electricity storage device 49 to the rotor winding 40 through a switching operation of the inverter 47. On the other hand, when the torque $\tau_{coup}$ between the first rotor 31 and the second rotor 32 is to be applied in a direction to reduce the rotational speed difference between the right drive shaft 26 and the left drive shaft 27 (the rotational speed difference between the first rotor 31 and the second rotor 32), a switching operation of the inverter 47 is applied so that the AC electric power of the rotor winding 40 is converted to DC and recovered to the electricity storage device 49. For example, when the torque $-\tau_{coup}$ in the direction opposite the rotational direction is to be applied to the first rotor 31 and the torque $\tau_{coup}$ in the same direction as the rotational direction is to be applied to the second rotor 32 in a state where the rotational speed of the first rotor 31 is higher than the rotational speed of the second rotor 32, or when the torque $\tau_{coup}$ in the direction opposite the rotational direction is to be applied to the second rotor 32 and the torque $\tau_{coup}$ in the same direction as the rotational direction is to be applied to the first rotor 31 in a state where the rotational speed of the second rotor 32 is higher than the rotational speed of the first rotor 31, electric power is recovered from the rotor winding 40 to the electricity storage device 49 through a switching operation of the inverter 47.

In the present embodiment described above, the drive torque distribution between the right drive shaft 26 and the left drive shaft 27 can be adjusted according to the torque $\tau_{coup}$ generated between the first rotor 31 and the second rotor 32. In this process, as compared to the above-described structure of International Publication No. 2011/76542 (with three planetary gear mechanisms), the number of rotation elements of the rotation transmitting device 50 can be reduced, and the structure for adjusting the drive torque distribution can be simplified. In addition, by designing the rotation is transmitting device 50 to satisfy Equation (2), the rotation transmitting device 50 can function as a torque amplification mechanism (gear-reduction mechanism) which amplifies the torque $\tau_{coup}$ between the first rotor 31 and the second rotor 32 and outputs from the sun gear 53, and, thus, the torque capacity between the first rotor 31 and the second rotor 32 can be reduced, and, consequently, the size of the rotary electric machine 30 can be reduced.

In addition, when the right drive shaft 26 and the left drive shaft 27 rotate in the same direction at equal rotational speeds, the sun gears 51 and 53, the ring gear 52, the pinion gears 54 and 55, and the carrier 56 of the rotation transmitting device 50 integrally rotate (there is no differential). Therefore, loss at the rotation transmitting device 50 can be reduced. In addition, in this case, the first rotor 31 and the second rotor 32 rotate in the same direction at equal rotational speeds, and no torque $\tau_{coup}$ is generated between the first rotor 31 and the second rotor 32, and, thus, loss at the rotary electric machine 30 can be reduced. Therefore, loss when the right drive shaft 26 and the left drive shaft 27 rotate in the same direction at equal rotational speeds can be reduced.

Moreover, according to the present embodiment, even in a structure of the differential device 10 in which the rotation center axis of the pinion gear 13 (the center axis of the pinion shaft 15) is perpendicular to the rotation center axes of the side gears 11 and 12 and the rotation case 14, the rotary electric machine 30 and the rotation transmitting device 50 for adjusting the drive torque distribution can be easily placed.

In the present embodiment, alternatively, the permanent magnet 43 may be provided on the first rotor 31, the rotor winding 40 may be provided on the second rotor 32, and the slip ring 45 may be linked to the second rotor 32.

In addition, in the present embodiment, alternatively, a structure may be employed in which the sun gear 53 of the rotation transmitting device 50 mechanically engages the left drive shaft 27 and integrally rotates with the left side gear 12 and the left drive shaft 27. In other words, the rotation transmitting device 50 may have a structure to transmit rotation corresponding to the rotational difference between the first rotor 31 and the second rotor 32 to the left side gear 12 (left drive shaft 27) of the differential device 10. In this case, the first rotor 31, the second rotor 32, the slip ring 45, the brush 46, and the rotation transmitting device 50 are preferably placed at an outer circumferential side of the left drive shaft 27.

Second Preferred Embodiment

Figure 2:
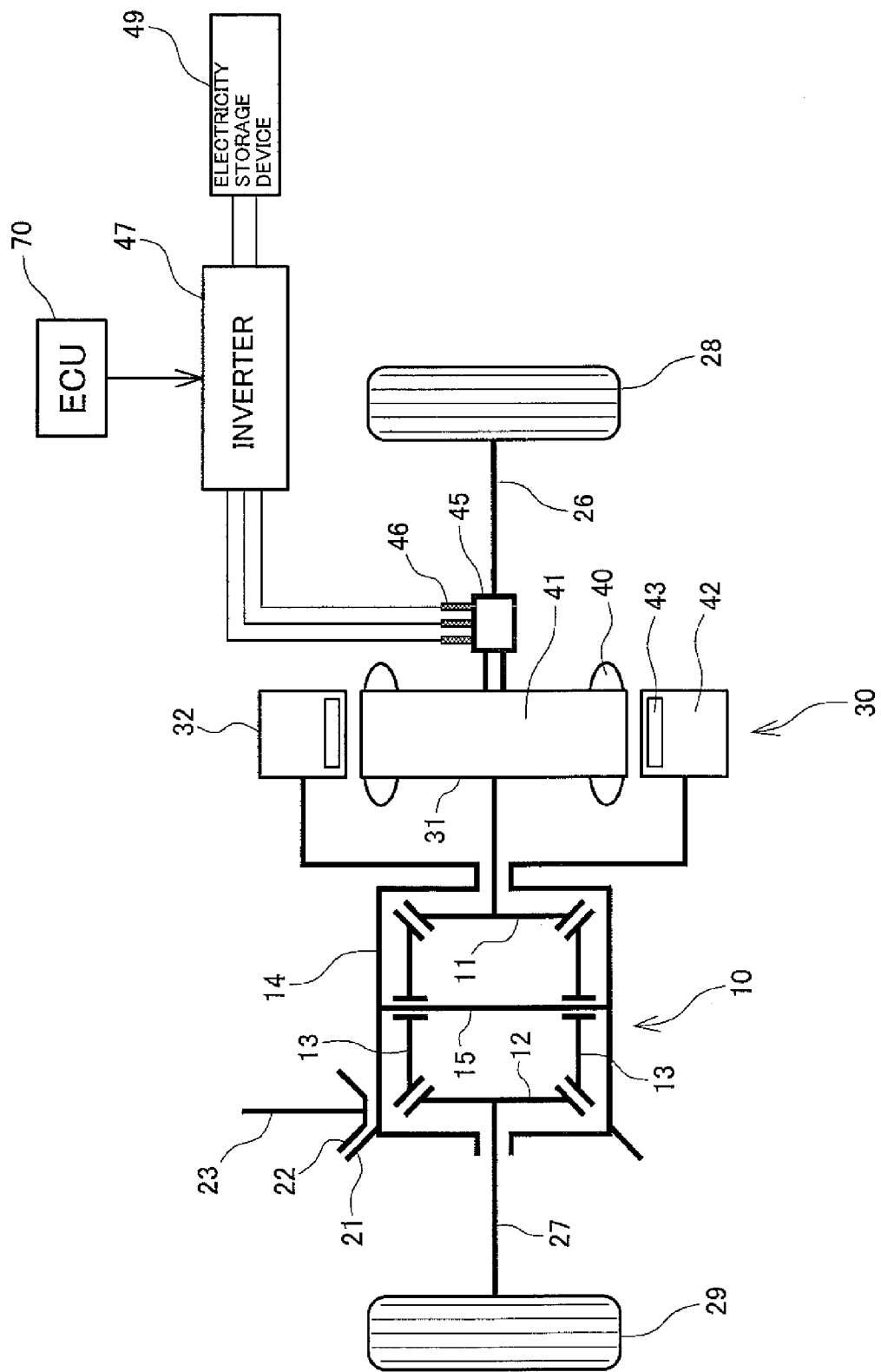
FIG. 2 is a diagram schematically showing a structure of a drive torque distribution apparatus according to a second preferred embodiment of the present invention.

FIG. 2 is a diagram schematically showing a drive torque distribution device according to a second preferred embodiment of the present invention. In the following description of the second preferred embodiment, structures similar to or corresponding to the structures of the first preferred embodiment are assigned the same reference numerals, and structures that are not specifically described are similar to those of the first preferred embodiment.

In the present embodiment, the first rotor 31 and the slip ring 45 mechanically engage the right drive shaft 26 and integrally rotate with the right side gear 11 and the right drive shaft 26 at equal rotational speeds. The second rotor is mechanically linked to the rotation case 14, and integrally rotates with the rotation case 14 at an equal rotational speed. In the example configuration shown in FIG. 2, the first rotor 31 and the second rotor 32 oppose in the radial direction orthogonal to the rotor rotational axis, the second rotor 32 is concentrically placed at an outer circumferential side of the first rotor 31, and the rotation center axis of the first rotor 31 and the rotation center axis of the second rotor 32 are coincident with the rotation center axis of the right drive shaft 26 (the rotation center axis of the right side gear 11).

When the right drive shaft 26 and the left drive shaft (the right drive wheel 28 and the left drive wheel 29) rotate in the same direction at equal rotational speeds, the side gears 11 and 12, the pinion gear 13, and the rotation case 14 of the differential device 10 are integrally and rotationally rotated. Therefore, the first rotor 31 and the second rotor 32 of the rotary electric machine 30 rotate in the same direction at equal rotational speeds. When the drive torque is to be equivalently distributed between the right drive shaft 26 and the left drive shaft 27, no switching operation of the inverter 47 is applied, so that no AC current is applied in the rotor winding 40, and, consequently, the torque $\tau_{coup}$ is not generated between the first rotor 31 and the second rotor 32.

On the other hand, when the AC current is applied in the rotor winding 40 through the switching operation of the inverter 47, and the torque $\tau_{coup}$ is generated between the first rotor 31 and the second rotor 32, the first rotor 31 and the second rotor 32 rotate relative to each other and a rotational difference is generated. In addition, the rotation of the first rotor 31 is transmitted to the right side gear 11 of the differential device 10 and the rotation of the second rotor 32 is transmitted to the rotation case 14 of the differential device 10, causing a rotational difference to be generated between the right side gear 11 and the rotation case 14. The torque applied from the first rotor 31 to the right side gear 11 and the torque applied from the second rotor 32 to the rotation case 14 are in opposite directions from each other, and, with the pinion gears 13 rotating (spinning) around the pinion shaft 15 at a rotational speed corresponding to the rotational speed difference between the right side gear 11 and the rotation case 14 (the rotational speed difference between the first rotor 31 and the second rotor 32), the left side gear 12 is rotationally driven. With this process, the drive torque distribution between the right drive shaft 26 and the left drive shaft 27 is changed, and a rotational difference corresponding to the spinning speed of the pinion gear 13 (the rotational speed difference between the first rotor 31 and the second rotor 32) is generated between the right drive shaft 26 and the left drive shaft 27. When a rotational difference is generated between the right drive shaft 26 and the left drive shaft 27, as the rotational speed difference between the first rotor 31 and the second rotor 32 becomes larger, the rotational speed difference between the right drive shaft 26 and the left drive shaft 27 becomes larger.

For example, when the torque $\tau_{coup}$ in the same direction as the rotational direction of the first rotor 31 and the second rotor 32 is applied from the second rotor 32 to the first rotor 31 and, as a reaction thereof, the torque $-\tau_{coup}$ in the direction opposite the rotational direction of the first rotor 31 and the second rotor 32 is applied from the first rotor 31 to the second rotor 32, the drive torque distribution of the right drive shaft 26 is increased and the drive torque distribution of the left drive shaft 27 is reduced. When the rotational speed of the first rotor 31 becomes higher than the rotational speed of the second rotor 32, the rotational speed of the right drive shaft 26 becomes higher than the rotational speed of the left drive shaft 27.

On the other hand, when the torque $-\tau_{coup}$ in the direction opposite the rotational direction of the first rotor 31 and the second rotor 32 is applied from the second rotor 32 to the first rotor 31, and, as a reaction thereof, the torque $\tau_{coup}$ in the same direction as the rotational direction of the first rotor 31 and the second rotor 32 is applied from the first rotor 31 to the second rotor 32, the drive torque distribution of the right drive shaft 26 is reduced and the drive torque distribution of the left drive shaft 27 is increased. When the rotational speed of the first rotor 31 becomes lower than the rotational speed of the second rotor 32, the rotational speed of the right drive shaft 26 becomes lower than the rotational speed of the left drive shaft 27.

The torque $\tau_{coup}$ between the first rotor 31 and the second rotor 32 for generating a drive torque difference of $2 \times \tau$ between the right drive shaft 26 and the left drive shaft 27 is $2 \times \tau$, and, as the torque $\tau_{coup}$ applied between the first rotor 31 and the second rotor 32 is increased, the drive torque difference between the right drive shaft 26 and the left drive shaft 27 is increased. Therefore, the drive torque distribution between the right drive shaft 26 and the left drive shaft 27 is adjusted according to the torque $\tau_{coup}$ generated between the first rotor 31 and the second rotor 32, and the rotary electric machine 30 functions as a torque distribution adjusting device that adjusts the drive torque distribution between the right drive shaft 26 and the left drive shaft 27. The electronic control unit 70 controls the drive torque distribution between the right drive shaft 26 and the left drive shaft 27 by controlling the AC current flowing in the phases of the rotor winding 40 through the switching operation of the inverter 47, and consequently controlling the torque $\tau_{coup}$ between the first rotor 31 and the second rotor 32.

In the present embodiment described above also, the drive torque distribution between the right drive shaft 26 and the left drive shaft 27 can be adjusted according to the torque $\tau_{coup}$ generated between the first rotor 31 and the second rotor 32. In this case, as compared to the first preferred embodiment, the rotation transmitting device 50 can be omitted, and, therefore, the structure for adjusting the drive torque distribution can be further simplified.

When the right drive shaft 26 and the left drive shaft 27 rotate in the same direction at equal rotational speeds, the first rotor 31 and the second rotor 32 rotate in the same direction at equal rotational speeds, and the torque $\tau_{coup}$ is not generated between the first rotor 31 and the second rotor 32. Because of this, loss at the rotary electric machine 30 can be reduced.

In addition, according to the present embodiment, even in a structure of the differential device 10 in which the rotation center axis of the pinion gear 13 (the rotation center axis of the pinion shaft 15) is perpendicular to the rotation center axes of the side gears 11 and 12 and the rotation case 14, the rotary electric machine 30 for adjusting the drive torque distribution can be easily placed.

In the present embodiment also, alternatively, the permanent magnet 43 may be provided in the first rotor 31, the rotor winding 40 may be provided on the second rotor 32, and the slip ring 45 may be connected to the second rotor 32.

Moreover, in the present embodiment, alternatively, a structure may be employed in which the first rotor 31 and the slip ring 45 mechanically engage the left drive shaft 27, and integrally rotate with the left side gear 12 and the left drive shaft 27 at the same rotational speed.

Third Preferred Embodiment

Figure 3:
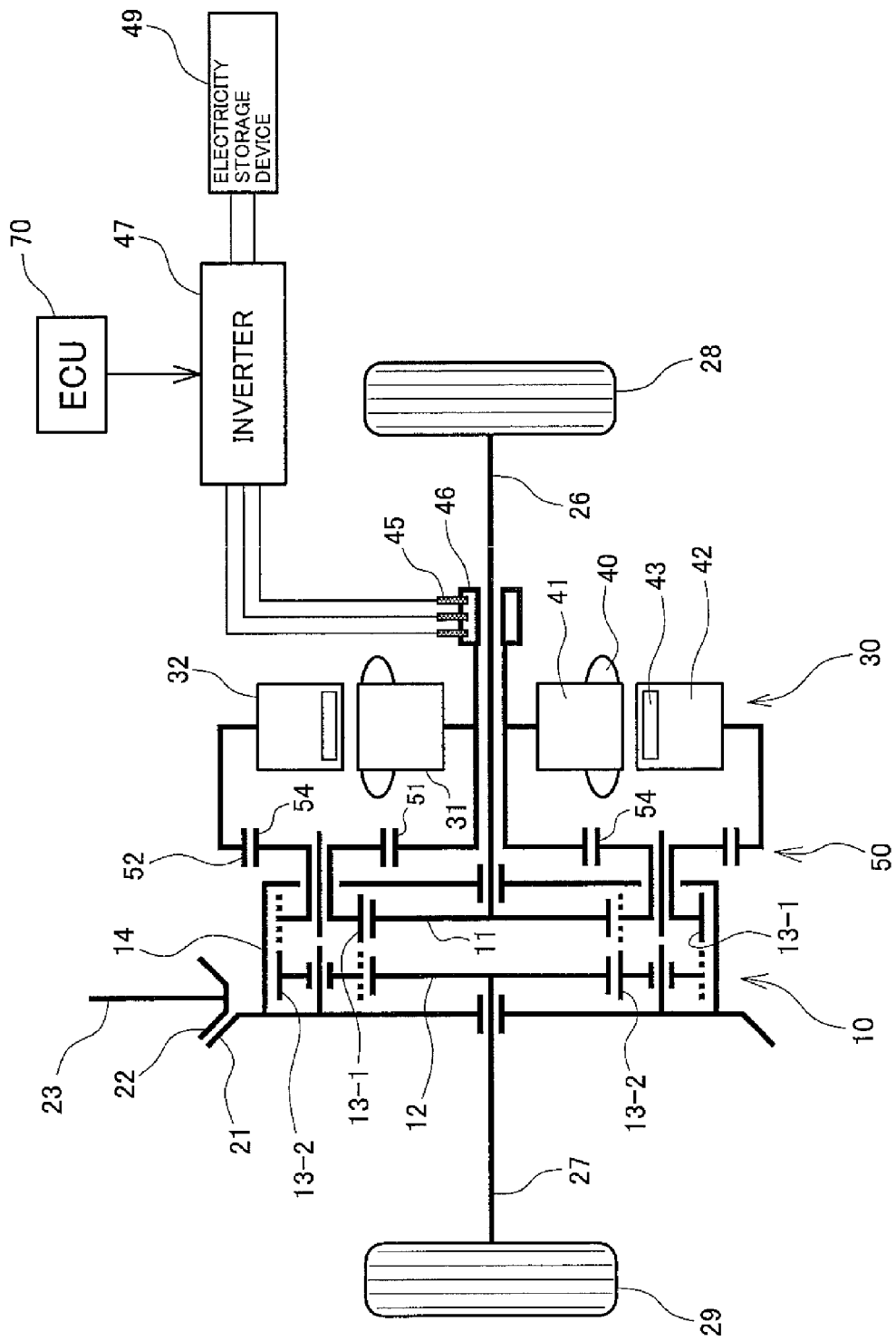
FIG. 3 is a diagram schematically showing a structure of a drive torque distribution apparatus according to a third preferred embodiment of the present invention.

FIG. 3 is a diagram schematically showing a structure of a drive torque distribution apparatus according to a third preferred embodiment of the present invention. In the following description of the third preferred embodiment, structures similar to or corresponding to the structures of the first and second preferred embodiments are assigned the same reference numerals, and structures that are not specifically described are similar to those of the first and second preferred embodiments.

In the present embodiment, the differential device 10 is formed from a differential gear device comprising a pair of side gears 11 and 12 acting as first and second differential rotation elements, a plurality of pinion gears 13-1 and 13-2 acting as a third differential rotation element, and a rotation case 14 acting as a fourth differential rotation element. The side gears 11 and 12 and the pinion gears 13-1 and 13-2 are formed with outer gears, the pinion gears 13-1 engage the right side gear 11, the pinion gears 13-2 engage the left side gear 12, and the pinion gears 13-1 and 13-2 engage each other. The pinion gears 13-1 and 13-2 are rotatably supported on the rotation case 14. Rotation center axes of the pinion gears 13-1 and 13-2 are parallel to the rotation center axes of the side gears 11 and 12 and the rotation case 14. When the pinion gears 13-1 and 13-2 rotate (spin), rotation is transmitted between the side gears 11 and 12 through the pinion gears 13-1 and 13-2. In this process, the torque is transmitted between the side gears 11 and 12 through the pinion gears 13-1 and 13-2 so that the directions of the torque are opposite from each other between the side gears 11 and 12. The pinion gears 13-1 and 13-2 also circle (revolve) around the rotation center axes of the side gears 11 and 12 in response to the rotation of the rotation case 14. With the circling (revolution) of the pinion gears 13-1 and 13-2, rotation is transmitted between the side gears 11 and 12 and the rotation case 14. In this process, the torque is transmitted between the side gears 11 and 12 and the rotation case 14 so that the directions of torque are the same between the side gear 11, the side gear 12, and the rotation case 14.

The rotation transmitting device 50 is formed from a planetary gear mechanism including a sun gear 51 acting as a first transmitting rotation element, a ring gear 52 acting as a second transmitting rotation element, and a plurality of pinion gears (planetary gears) 54 acting as a third transmitting rotation element. The pinion gears 54 engage the sun gear 51 and the ring gear 52. The pinion gears 54 are coupled with the pinion gears 13-1 of the differential device 10, and integrally rotate (spin) with the pinion gears 13-1 at the same rotational speed. In addition, the pinion gears 54 circle (revolve) around the rotation center axis of the sun gear 51 with the pinion gear 13-1 in response to the rotation of the rotation case 14. The sun gear 51 is mechanically linked to the first rotor 31, and integrally rotates with the first rotor 31 at the same rotational speed. The ring gear 52 is mechanically linked to the second rotor 32, and integrally rotates with the second rotor 32 at the same rotational speed. In the example configuration shown in FIG. 3, a radius $r_{s2}$ of the right side gear 11 is greater than a radius rs1 of the sun gear 51, and a radius $r_{p2}$ of the pinion gear 13-1 is smaller than a radius $r_{p1}$ of the pinion gear 54. A radius $r_{r1}$ ($r_{r1} = r_{s1} + 2 \times r_{p1}$) of the ring gear 52 is greater than a sum ($r_{s2} + 2 \times r_{p2}$) of the radius $r_{s2}$ of the right side gear 11 and a diameter of the pinion gear 13-1, $2 \times r_{p2}$. In addition, in the example configuration of FIG. 3, the rotation transmitting device 50 is placed at an outer circumferential side of the right drive shaft 26, and is placed at a position between the differential device 10 and the rotary electric machine 30 in the rotation center axis direction of the right drive shaft 26. The rotation center axes of the sun gear 51 and the ring gear 52 are coincident with the rotation center axis of the right drive shaft 26 (the rotation center axis of the right side gear 11).

When the right drive shaft 26 and the left drive shaft (the right drive wheel 28 and the left drive wheel 29) rotate in the same direction at equal rotational speeds, the pinion gears 13-1 and 13-2 do not rotate (spin), and the side gears 11 and 12, the pinion gears 13-1 and 13-2, and the rotation case 14 of the differential device 10 are integrally and rotationally driven. In addition, the pinion gear 54 of the rotation transmitting device 50 circles (revolves) around the rotation center axis of the right side gear 11 (the rotation center axis of the sun gear 51) with the pinion gear 13-1 in response to the rotation of the rotation case 14, so that the sun gear 51, the ring gear 52, and the pinion gear 54 of the rotation transmitting device 50 are integrally and rotationally driven. Therefore, the first rotor 31 and the second rotor 32 of the rotary electric machine 30 rotate in the same direction at equal rotational speeds. When the drive torque is to be equivalently distributed between the right drive shaft 26 and the left drive shaft 27, no switching operation of the inverter 47 is applied, so that no AC current is applied in the rotor winding 40, and, consequently, the torque $\tau_{coup}$ is not generated between the first rotor 31 and the second rotor 32.

On the other hand, when the AC current is applied to the rotor winding 40 through the switching operation of the inverter 47, the torque $\tau_{coup}$ is generated between the first rotor 31 and the second rotor 32, the first rotor 31 and the second rotor 32 rotate relative to each other and a rotational difference is generated, and a rotational difference is generated between the sun gear 51 and the ring gear 52 of the rotation transmitting device 50. A torque applied from the first rotor 31 through the sun gear 51 to the pinion gears 13-1 and 54 and a torque applied from the second rotor 32 through the ring gear 52 to the pinion gears 13-1 and 54 are in the same direction, the pinion gears 13-1 and 54 integrally rotate (spin) at a rotational speed corresponding to the rotational speed difference between the sun gear 51 and the ring gear 52 (the rotational speed difference between the first rotor 31 and the second rotor 32), and the rotations of the pinion gears 13-1 and 54 are transmitted to the right side gear 11 and through the pinion gear 13-2 to the left side gear 12. A torque applied from the pinion gears 13-1 and 54 to the right side gear 11 and a torque applied from the pinion gears 13-1 and 54 through the pinion gear 13-2 to the left side gear 12 are in directions opposite from each other. Thus, the drive torque distribution between the right drive shaft 26 and the left drive shaft 27 is changed, and a rotational difference corresponding to the spinning speed of the pinion gears 13-1 and 54 (the rotational speed difference between the first rotor 31 and the second rotor 32) is generated between the right drive shaft 26 and the left drive shaft 27. In this process, the rotation transmitting device 50 transmits rotation corresponding to the rotational difference between the first rotor 31 and the second rotor 32 to the pinion gear 13-1, so that the pinion gears 13-1 and 13-2 rotate (spin), and the rotational difference between the right side gear 11 and the left side gear 12 (the right drive shaft 26 and the left drive shaft 27) is permitted. When a rotational difference is generated between the right drive shaft 26 and the left drive shaft 27, as the rotational speed difference between the first rotor 31 and the second rotor 32 becomes larger, the rotational speed difference between the right drive shaft 26 and the left drive shaft 27 becomes larger.

For example, when the torque $\tau_{coup}$ in the same direction as the rotational direction of the first rotor 31 and the second rotor 32 is applied from the second rotor 32 to the first rotor 31 and, as a reaction thereof, the torque $-\tau_{coup}$ in the opposite direction from the rotational direction of the first rotor 31 and the second rotor 32 is applied from the first rotor 31 to the second rotor 32, the drive torque distribution of the right drive shaft 26 is increased and the drive torque distribution of the left drive shaft 27 is reduced. When the rotational speed of the first rotor 31 becomes higher than the rotational speed of the second rotor 32, the rotational speed of the right drive shaft 26 becomes higher than the rotational speed of the left drive shaft 27.

On the other hand, when the torque $-\tau_{coup}$ in the direction opposite the rotational direction of the first rotor 31 and the second rotor 32 is applied from the second rotor 32 to the first rotor 31, and, as a reaction thereof, the torque $\tau_{coup}$ in the same direction as the rotational direction of the first rotor 31 and the second rotor 32 is applied from the first rotor 31 to the second rotor 32, the drive torque distribution of the right drive shaft 26 is reduced and the drive torque distribution of the left drive shaft 27 is increased. When the rotational speed of the first rotor 31 becomes lower than the rotational speed of the second rotor 32, the rotational speed of the right drive shaft 26 becomes lower than the rotational speed of the left drive shaft 27.

A torque $\tau_{coup}$ between the first rotor 31 and the second rotor 32 for generating the drive torque difference of $2 \times \tau$ between the right drive shaft 26 and the left drive shaft 27 is represented by the following Equation (3). As shown in Equation (3), as the torque $\tau_{coup}$ applied between the first rotor 31 and the second rotor 32 becomes larger, the drive torque difference between the right drive shaft 26 and the left drive shaft 27 becomes larger. Therefore, the drive torque distribution between the right drive shaft 26 and the left drive shaft 27 is adjusted according to the torque $\tau_{coup}$ generated between the first rotor 31 and the second rotor 32, and the rotary electric machine 30 and the rotation transmitting device 50 function as a torque distribution adjusting device that adjusts the drive torque distribution between the right drive shaft 26 and the left drive shaft 27. In this case, when the rotation transmitting device 50 is designed to satisfy the following Equation (4), the torque $\tau_{coup}$ between the first rotor 31 and the second rotor 32 is amplified and transmitted to the right side gear 11, and, thus, the rotation transmitting device 50 functions as a torque amplification mechanism (gear-reduction mechanism). The electronic control unit 70 can control the drive torque distribution between the right drive shaft 26 and the left drive shaft 27 by controlling the AC current flowing in the phases of the rotor winding 40 through the switching operation of the inverter 47, and consequently controlling the torque $\tau_{coup}$ between the first rotor 31 and the second rotor 32.

[Equation 2]

$$\tau_{COUP} = \frac{2 r_{p2} r_{r1} r_{s1}}{r_{s2}(r_{p1} r_{s1} + r_{p1} r_{r1})} \tau \quad (3)$$

$$\left( \frac{r_{p1}}{r_{r1}} + \frac{r_{p1}}{r_{s1}} \right) \times \frac{r_{s2}}{r_{p2}} > 1 \quad (4)$$

In the present embodiment described above also, the drive torque distribution between the right drive shaft 26 and the left drive shaft 27 can be adjusted according to the torque $\tau_{coup}$ generated between the first rotor 31 and the second rotor 32. In this case, compared to the structure of International Publication No. 2011/76542 described above (with three planetary gear mechanisms) or the structure of the first preferred embodiment, the number of the rotation elements of the rotation transmitting device 50 can be reduced, and the structure for adjusting the drive torque distribution can be further simplified. In addition, by designing the rotation transmitting device 50 to satisfy Equation (4), the rotation transmitting device 50 functions as a torque amplification mechanism (gear-reduction mechanism) which amplifies the torque $\tau_{coup}$ between the first rotor 31 and the second rotor 32 and transmits the same to the right side gear 11, and, thus, a torque capacity between the first rotor 31 and the second rotor 22 can be reduced, and consequently the size of the rotary electric machine 30 can be reduced.

Moreover, when the right drive shaft 26 and the left drive shaft 27 rotate in the same direction at equal rotational speeds, the sun gear 51, the ring gear 52, and the pinion gear 54 of the rotation transmitting device 50 integrally rotate (there is no differential), and, thus, the loss at the rotation transmitting device 50 can be reduced. In addition, in this case, the first rotor 31 and the second rotor 32 rotate in the same direction at equal rotational speeds, and there is no need to generate the torque $\tau_{coup}$ between the first rotor 31 and the second rotor 32. Thus, loss at the rotary electric machine 30 can be reduced. Therefore, the loss when the right drive shaft 26 and the left drive shaft 27 rotate in the same direction at equal rotational speeds can be reduced.

In the present embodiment also, alternatively, the permanent magnet 43 may be provided on the first rotor, the rotor winding 40 may be provided on the second rotor 32, and the slip ring 45 may be connected to the second rotor 32.

In addition, in the present embodiment, alternatively, a configuration may be employed in which the pinion gear 54 of the rotation transmitting device 50 is coupled with the pinion gear 13-2 of the differential device 10, and integrally rotates (spins) with the pinion gear 13-2 at the same rotational speed. In other words, the rotation transmitting device 50 may have a structure to transmit rotation corresponding to the rotational difference between the first rotor 31 and the second rotor 32 to the pinion gear 13-2 of the differential device 10. In this case, the first rotor 31, the second rotor 32, the slip ring 45, the brush 46, and rotation transmitting device 50 are preferably placed at an outer circumferential side of the left drive shaft 27.

Fourth Preferred Embodiment

Figure 4:
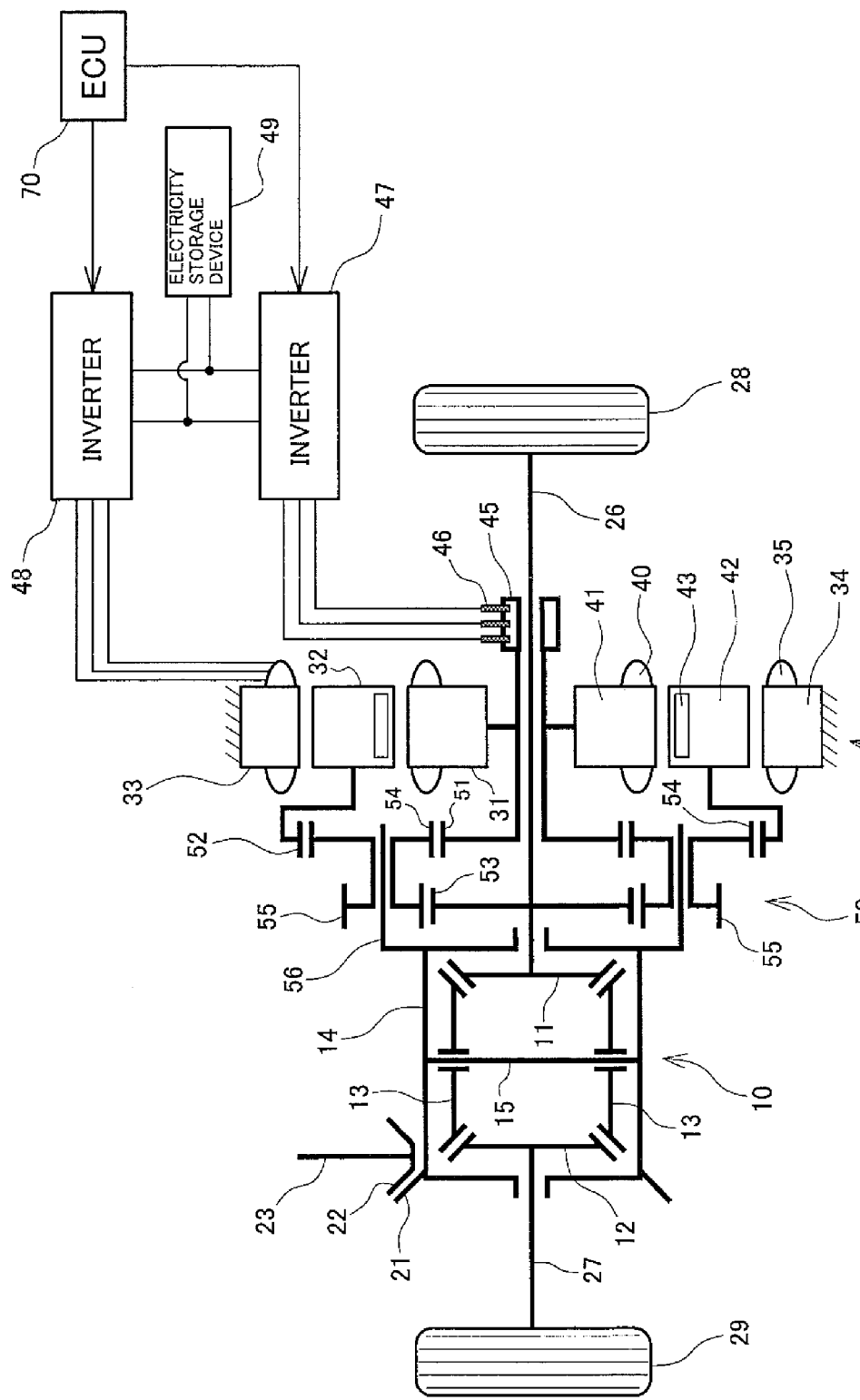
FIG. 4 is a diagram schematically showing a structure of a drive torque distribution apparatus according to a fourth preferred embodiment of the present invention.

FIG. 4 is a diagram schematically showing a drive torque distribution device according to a fourth preferred embodiment of the present invention. In the following description of the fourth preferred embodiment, structures identical to or corresponding to those of the first through third preferred embodiments are assigned the same reference numerals, and structures that are not described are similar to those in the first through third preferred embodiments.

In the present embodiment, compared to the first preferred embodiment, the rotary electric machine 30 further comprises a stator 33 which is placed opposing the second rotor with a predetermined gap therebetween. The stator 33 comprises a stator core 34 and a stator winding 35 of a plurality of phases (for example, three phases) placed on the stator core 34 along a circumferential direction thereof. By an AC current of a plurality of phases (for example, three phases) flowing in the stator winding 35 of the plurality of phases, a rotational magnetic field that rotates in the circumferential direction of the stator can be generated in the stator winding 35. The second rotor 32 further comprises a permanent magnet 44 which is placed on the rotor core 42 along the circumferential direction thereof and opposing the stator 33, and which generates a field magnetic flux. Alternatively, the permanent magnets 43 and 44 may be integrated. In the example configuration shown in FIG. 4, the stator 33 and the second rotor 32 oppose in the radial direction orthogonal to the rotor rotational axis, and the stator 33 is placed concentrically on an outer circumferential side of the second rotor 32.

An inverter 48 provided between the electricity storage device 49 and the stator winding 35 as an electric power conversion device for converting the electric power can be realized by a known structure having a switching element, and a diode (rectifying element) which is connected to the switching element in a reverse parallel manner, and can convert, through a switching operation of the switching element, DC electric power from the electricity storage device 49 into AC electric power (for example, three-phase AC) and supply the same to the phases of the stator winding 35. The inverter 48 can also convert the AC current flowing in the phases of the stator winding 35 into DC, to recover the electric energy in the electricity storage device 49. In this manner, the inverter 48 can convert the power in both directions between the electricity storage device 49 and the stator winding 35.

When an AC current of a plurality of phases (for example, three phases) flows in the stator winding 35 of the plurality of phases through the switching operation of the inverter 48, the stator winding 35 generates a rotational magnetic field which rotates in the circumferential direction of the stator. By an electromagnetic interaction (attraction and repulsion actions) between the rotational magnetic field generated in the stator winding 35 and the field magnetic flux generated at the permanent magnet, a torque (magnet torque) can be applied between the stator 33 and the second rotor 32, and the second rotor 32 can be rotationally driven. The electronic control unit 70 can control the torque applied between the stator 33 and the second rotor 32 by controlling the AC current flowing in the phases of the stator winding 35 through the switching operation of the inverter 48; for example, controlling the amplitude and phase angle of the AC current flowing in the stator winding 35.

Figure 5:
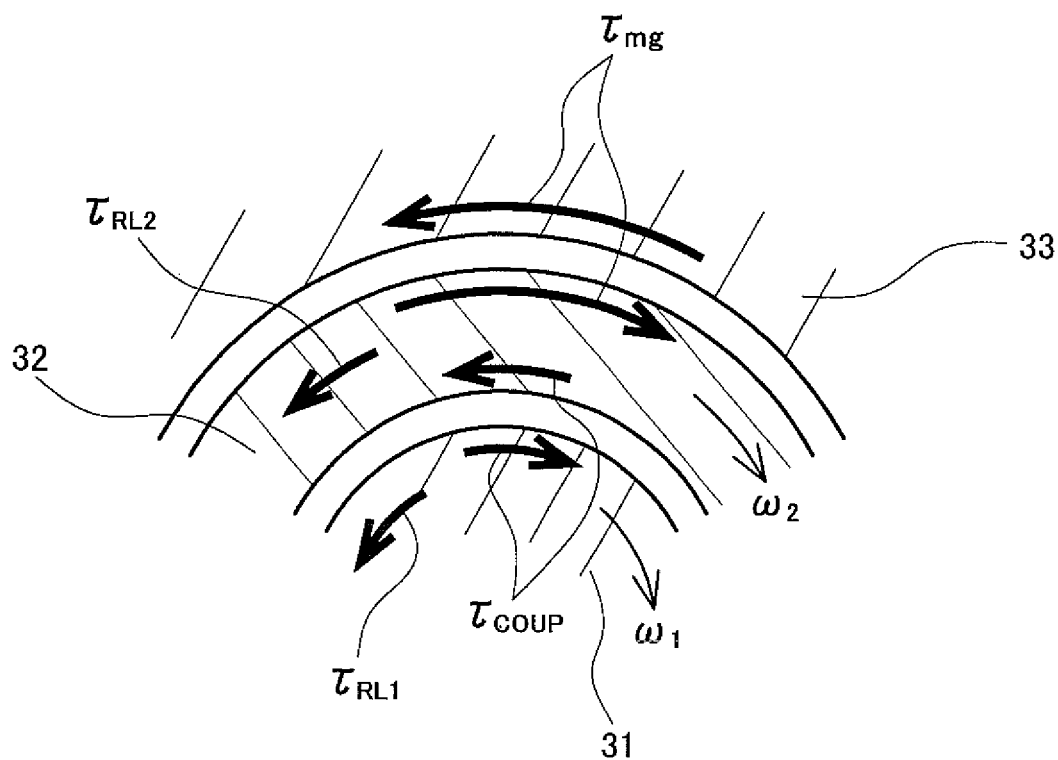
FIG. 5 is a diagram for explaining torques applied on a first rotor 31, a second rotor 32, and a stator 33 of a rotary electric machine 30.

Equations of motion of the first and second rotors 31 and 32 when a torque $\tau_{mg}$ is generated between the stator 33 and the second rotor 32 by applying an AC current to the stator winding 35 through the switching operation of the inverter 48 and a torque $\tau_{coup}$ is generated between the first rotor 31 and the second rotor 32 by applying an AC current to the rotor winding 40 through the switching operation of the inverter 47 are shown in the following Equations (5) and (6). In Equations (5) and (6), $J_1$ represents a moment of inertia of the first rotor 31, $J_2$ represents a moment of inertia of the second rotor 32, $\omega_1$ represents a rotational speed of the first rotor 31, $\omega_2$ represents a rotational speed of the second rotor 32, $\tau_{RL1}$ represents a load torque of the first rotor 31, and $\tau_{RL2}$ represents a load torque of the second rotor 32. As shown in FIG. 5, for $\tau_{coup}$, the rotational direction (clockwise direction in FIG. 5) of the first rotor 31 when the drive shafts 26 and 27 rotate in the same direction at equal rotational speeds is set as a positive direction, and for $\tau_{mg}$, the rotational direction (clockwise direction in FIG. 5) of the second rotor 32 when the drive shafts 26 and 27 rotate in the same direction at an equal speed is set as a positive direction.

[Equations 3]

$$J_1 \times \dot{\omega}_1 = \tau_{COUP} - \tau_{RL1} \quad (5)$$

$$J_2 \times \dot{\omega}_2 = \tau_{mg} - \tau_{COUP} - \tau_{RL2} \quad (6)$$

When $\tau_{EV}$ is set as a desired drive torque, $\tau_{mg} = \tau_{EV}$, and $\tau_{coup} = \tau_{EV}/2$, Equations (5) and (6) may be rewritten as the following Equations (7) and (8). In this case, the torque applied from the first rotor 31 to the second rotor 32 is ½ of the torque applied from the stator 33 to the second rotor 32, and is in the opposite direction from the torque applied from the stator 33 to the second rotor 32. Therefore, a combined torque of $\tau_{mg}$ and $\tau_{coup}$ applied to the second rotor 32 is equal to and in the same direction as the torque $\tau_{coup}$ applied to the first rotor 31.

[Equations 4]

$$J_1 \times \dot{\omega}_1 = \frac{1}{2} \times \tau_{EV} - \tau_{RL1} \quad (7)$$

$$J_2 \times \dot{\omega}_2 = \frac{1}{2} \times \tau_{EV} - \tau_{RL2} \quad (8)$$

Based on Equations (7) and (8), when the loads and the moments of inertia are the same for the first and second rotors 31 and 32, the first and second rotors 31 and 32 rotate in the same direction at equal rotational speeds by the torques $\tau_{mg}$ and $\tau_{coup}$, and, by the sun gear 51 and the ring gear 52 of the rotation transmitting device 50 rotating in the same direction at equal rotational speeds, the pinion gears 54 and 55 circle (revolve) around the rotation center axes of the sun gears 51 and 53. Therefore, by the torques $\tau_{mg}$ and $\tau_{coup}$, the sun gears 51 and 53, the ring gear 52, the pinion gears 54 and 55, and the carrier 56 of the rotation transmitting device are integrally and rotationally driven. In addition, by the rotation case 14 of the differential device 10 rotationally driven in response to the rotation of the carrier 56, the side gears 11 and 12, the pinion gear 13, and the rotation case 14 of the differential device 10 are integrally and rotationally driven. Therefore, the drive torque is equivalently distributed between the right drive shaft 26 and the left drive shaft 27, and the right drive shaft 26 and the left drive shaft 27 are rotationally driven in the same direction at equal rotational speeds.

In addition, when $\tau_{mg} = \tau_{EV}$, $\tau_{coup} > \tau_{EV}/2$, and a combined torque of $\tau_{mg}$ and $\tau_{coup}$ applied to the second rotor 32 is smaller than and in the same direction as the torque $\tau_{coup}$ applied to the first rotor 31, the drive torque distribution of the right drive shaft 26 is increased and the drive torque distribution of the left drive shaft 27 is reduced. When the rotational speed of the first rotor 31 becomes higher than the rotational speed of the second rotor 32, the rotational speed of the right drive shaft 26 becomes higher than the rotational speed of the left drive shaft 27.

On the other hand, when $\tau_{mg} = \tau_{EV}$, $\tau_{coup} < \tau_{EV}/2$, and the combined torque of $\tau_{mg}$ and $\tau_{coup}$ applied to the second rotor 32 is greater than and in the same direction as the torque $\tau_{coup}$ applied to the first rotor 31, the drive torque distribution of the right drive shaft 26 is reduced and the drive torque distribution of the left drive shaft 27 is increased. When the rotational speed of the first rotor 31 becomes lower than the rotational speed of the second rotor 32, the rotational speed of the right drive shaft 26 becomes lower than the rotational speed of the left drive shaft 27.

Even when the loads of the first and second rotors 31 and 32 are not equal, in order to rotate the first and second rotors 31 and 32 in the same direction at equal rotational speeds, the electronic control unit 70 preferably applies a feedback control using the rotational speeds $\omega_1$ and $\omega_2$ of the first and second rotors 31 and 32. For example, the torque $\tau_{mg}$ between the stator 33 and the second rotor 32 is preferably controlled based on a difference between the rotational speed $\omega_2$ of the second rotor 32 and a target rotational speed $\omega_{ref}$ (which is set to, for example, the rotational speed of the rotation case 14) so that the rotational speed $\omega_2$ of the second rotor 32 becomes equal to the target rotational speed, and the torque $\tau_{coup}$ between the first rotor 31 and the second rotor 32 is preferably controlled based on a difference between the rotational speed $\omega_1$ of the first rotor 31 and the target rotational speed $\omega_{ref}$ so that the rotational speed $\omega_1$ of the first rotor 31 becomes equal to the target rotational speed $\omega_{ref}$.

In the present embodiment also, the drive torque distribution between the right drive shaft 26 and the left drive shaft 27 can be adjusted according to the torque $\tau_{coup}$ generated between the first rotor 31 and the second rotor 32. In addition, in the present embodiment, the torque $\tau_{mg}$ can be generated between the stator 33 and the second rotor 32, and the torque $\tau_{coup}$ can be generated between the first rotor 31 and the second rotor 32, so that the drive shafts 26 and 27 can be rotationally driven by the torques $\tau_{mg}$ and $\tau_{coup}$ even without transmitting the motive power from the motive power source such as the engine or the motor through the propeller shaft 23 to the rotation case 14. Alternatively, the motive power from the motive power source such as the engine or the motor may be transmitted through the propeller shaft 23 to the rotation case 14, and, at the same time, the torques $\tau_{mg}$ and $\tau_{coup}$ may be generated, to increase the drive torques for the drive shafts 26 and 27.

Fifth Preferred Embodiment

Figure 6:
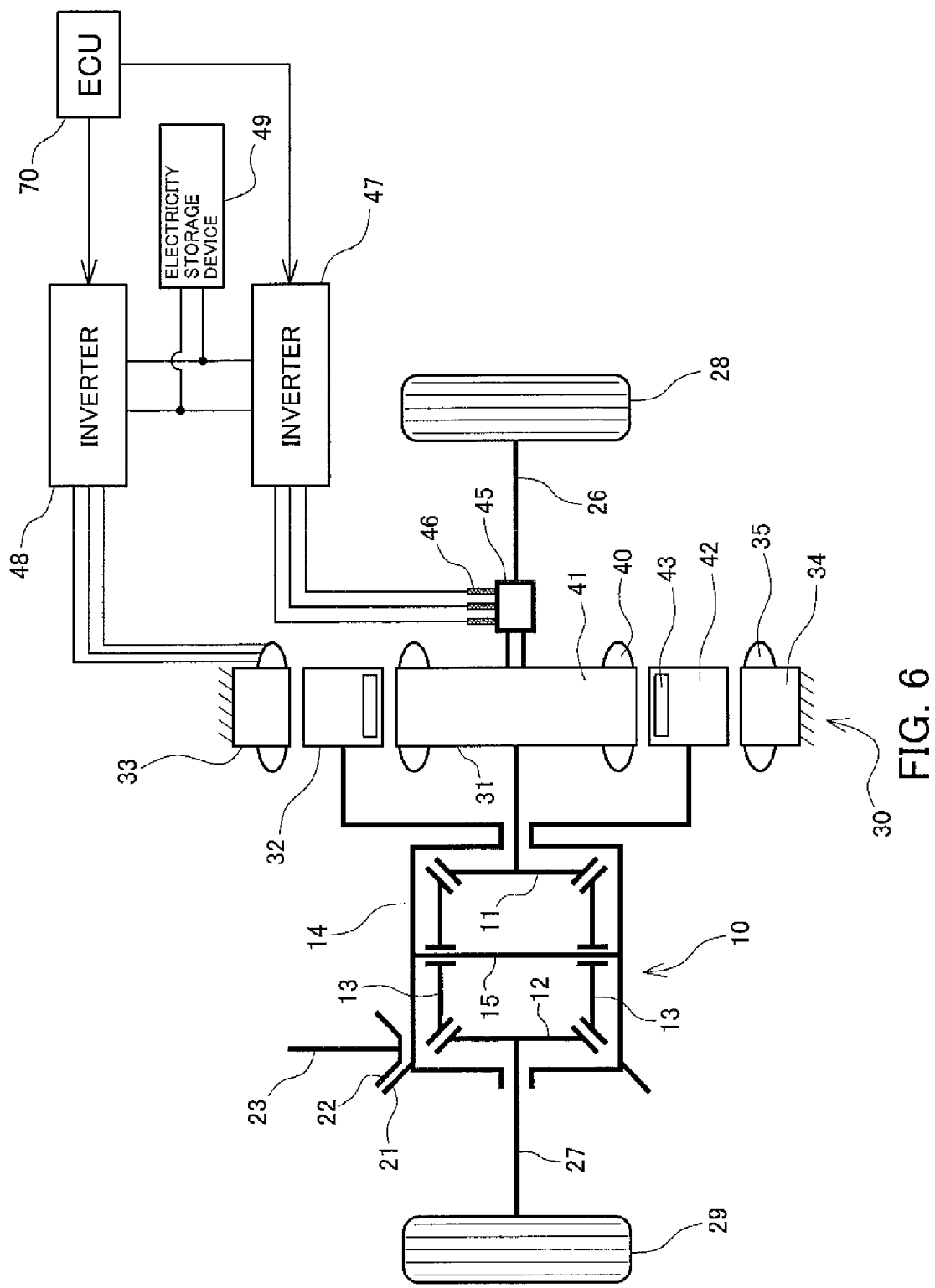
FIG. 6 is a diagram schematically showing a structure of a drive torque distribution apparatus according to a fifth preferred embodiment of the present invention.

FIG. 6 is a diagram schematically showing a structure of a drive torque distribution device according to a fifth preferred embodiment of the present invention. In the following description of the fifth preferred embodiment, structures similar to or corresponding to those of the first through fourth preferred embodiments are assigned the same reference numerals, and structures that are not described are similar to those of the first through fourth preferred embodiments.

In the present embodiment, compared to the second preferred embodiment, the rotary electric machine 30 further comprises a stator 33. When a torque $\tau_{mg}$ is generated between the stator 33 and the second rotor 32 by applying an AC current to the stator winding 35 through a switching operation of the inverter 48, the rotation case 14 of the differential device 10 is rotationally driven in response to the rotation of the second rotor 32, so that the side gears 11 and 12, the pinion gear 13, and the rotation case 14 of the differential device 10 are integrally and rotationally driven. Therefore, the drive torque is equivalently distributed between the right drive shaft 26 and the left drive shaft 27, and the right drive shaft 26 and the left drive shaft 27 are rotationally driven in the same direction at equal rotational speeds.

In the present embodiment also, the drive torque distribution between the right drive shaft 26 and the left drive shaft 27 can be adjusted according to the torque $\tau_{coup}$ generated between the first rotor 31 and the second rotor 32. In addition, in the present embodiment, by generating the torque $\tau_{mg}$ between the stator 33 an the second rotor 32, the drive shafts 26 and 27 can be rotationally driven by the torque $\tau_{mg}$ even without transmitting the motive power from the motive power source such as the engine or the motor through the propeller shaft 23 to the rotation case 14. Alternatively, the motive power from the motive power source such as the engine or the motor may be transmitted through the propeller shaft 23 to the rotation case 14, and, at the same time, the torque $\tau_{mg}$ may be generated, to increase the drive torques for the drive shafts 26 and 27.

Sixth Preferred Embodiment

FIG. 7 is a diagram schematically showing a structure of a drive torque distribution device according to a sixth preferred embodiment of the present invention. In the following description of the sixth preferred embodiment, structures identical to or corresponding to the structures of the first through fifth preferred embodiments are assigned the same reference numerals, and structures that are not described are similar to those of the first through fifth preferred embodiments.

In the present embodiment, compared to the third preferred embodiment, the rotary electric machine 30 further comprises a stator 33. In the present embodiment also, the drive torque distribution between the right drive shaft 26 and the left drive shaft 27 can be adjusted according to the torque $\tau_{coup}$ generated between the first rotor 31 and the second rotor 32. In addition, in the present embodiment, similar to the fourth preferred embodiment, by generating the torque $\tau_{mg}$ between the stator 33 and the second rotor 32 and the torque is $\tau_{coup}$ between the first rotor 31 and the second rotor 32, the drive shafts 26 and 27 can be rotationally driven by the torques $\tau_{mg}$ and $\tau_{coup}$ even without transmitting the motive power from the motive power source such as the engine or the motor through the propeller shaft 23 to the rotation case 14. Alternatively, the motive power from the motive power source such as the engine or the motor may be transmitted through the propeller shaft 23 to the rotation case 14, and, at the same time, the torques $\tau_{mg}$ and $\tau_{coup}$ may be generated, to increase the drive torques for the drive shafts 26 and 27.

In the first through sixth preferred embodiments, the structure for generating the torque between the first rotor 31 and the second rotor 32 is not limited to a structure which generates a magnet torque such as provision of the permanent magnet 43, and may alternatively be a structure which generates, for example, a reluctance torque. Similarly, in the fourth through sixth preferred embodiments, the structure which generates the torque between the stator 33 and the second rotor 32 is not limited to the structure which generates the magnet torque such as the provision of the permanent magnet 44, but alternatively be a structure which generates, for example, the reluctance torque.

In the above description of the preferred embodiments, a case is described in which the torque distribution between the right drive wheel 28 and the left drive wheel 29 of the vehicle is adjusted. However, the present invention may alternatively be applied to a case where the torque distribution between a front drive wheel and a rear drive wheel of the vehicle is adjusted. Moreover, the present invention can alternatively be applied to usages other than the vehicle.

Preferred embodiments of the present invention have been described. However, the present invention is not in any way limited by these embodiments, and includes various forms within the scope and spirit of the present invention.

What is claimed is:

1. A drive torque distribution apparatus, comprising:
    a differential device that permits a rotational difference between a first drive shaft and a second drive shaft, the differential device including a differential case and a differential gear which is enclosed in the differential case, a rotation of the differential case being transmitted to one of the first drive shaft and the second drive shaft via the differential gear, the differential case being connected to a power source and being rotationally driven by the power source; and
    a torque distribution adjusting device that adjusts a torque distribution between the first drive shaft and the second drive shaft, wherein
    the torque distribution adjusting device includes a rotary electric machine that can generate a torque between a first rotor and a second rotor rotatable relative to each other, the first rotor being mechanically connected to another of the first drive shaft and the second drive shaft, and the second rotor being mechanically connected to the differential case such that the second rotor and the differential case rotate together, thereby transmitting rotation of the first and second rotors or a rotation corresponding to a rotational difference between the first rotor and the second rotor to the differential device, the first rotor and the second rotor rotate at equal rotational speeds when the first drive shaft and the second drive shaft rotate at equal rotational speeds, a torque is generated between the first rotor and the second rotor to generate a rotational difference between the first rotor and the second rotor and to consequently generate a rotational difference between the first drive shaft and the second drive shaft, the torque distribution between the first drive shaft and the second drive shaft is adjusted according to the torque generated between the first rotor and the second rotor and the first rotor and the second rotor are disposed outside the differential case.

2. The drive torque distribution apparatus according to claim 1, wherein the differential gear comprises:

a first differential rotation element that rotates with the first drive shaft;

a second differential rotation element that rotates with the second drive shaft;

a third differential rotation element that transmits rotation between the first and second differential rotation elements; and the differential case rotatably supports the third differential rotation element and causes, with rotation thereof, the third differential rotation element to circle around a rotational axis of the first differential rotation element, wherein the rotational difference between the first drive shaft and the second drive shaft is permitted by rotation of the third differential rotation element, and in the torque distribution adjusting device, the first rotor rotates with the first differential rotation element or the second differential rotation element, and the second rotor rotates with the differential case.

3. The drive torque distribution apparatus according to claim 1, wherein the rotary electric machine comprises a stator that can generate a torque between the stator and the second rotor.

* * * * *